(No Model.) 2 Sheets—Sheet 2.

G. F. EVANS.
SPARK ARRESTER.

No. 448,216. Patented Mar. 17, 1891.

Witnesses.
E. K. Boynton
Henry T. Conant

Inventor.
George Frank Evans.
by H. E. Lodge Atty.

UNITED STATES PATENT OFFICE.

GEORGE FRANK EVANS, OF SOMERVILLE, MASSACHUSETTS.

SPARK-ARRESTER.

SPECIFICATION forming part of Letters Patent No. 448,216, dated March 17, 1891.

Application filed October 10, 1890. Serial No. 367,700. (No model.)

*To all whom it may concern:*

Be it known that I, GEORGE FRANK EVANS, a citizen of the United States, residing at Somerville, in the county of Middlesex and State of Massachusetts, have invented certain new and useful Improvements in Spark-Arresters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to apparatus by which cinders or other light refuse matter from furnaces employing a forced draft are prevented from escaping directly through the stack.

My invention is particularly adapted for furnaces of locomotives, and the object is to endeavor to retain the refuse matter due to the combustion within a suitable cinder-chamber, which can be emptied at any desirable time or place, and further, while preventing the escape of waste solid matter from the combustion, to retard as little as possible the escape of gases and steam through the stack.

The essential feature in this spark-arrester is to change the movement of the waste solid particles, together with the waste gaseous matter and steam, from right lines in an upward direction into a horizontal or oblique course of travel with rotary motion, and further, in relying upon the great elasticity of steam or waste gaseous matter compared with that of the refuse solid matter, which is little or none. These movements are produced by means of two or more segmental eccentrically-disposed plates with overlapping non-contiguous edges, which act as current-changers and are located centrally within the stack. Between the latter and the exterior of said plates are arranged a series of oblique deflectors, which act to direct the solid waste matter downward, the steam, however, due to its inherent elasticity, on the contrary, rising and escaping with little or no retardation.

Figure 1:
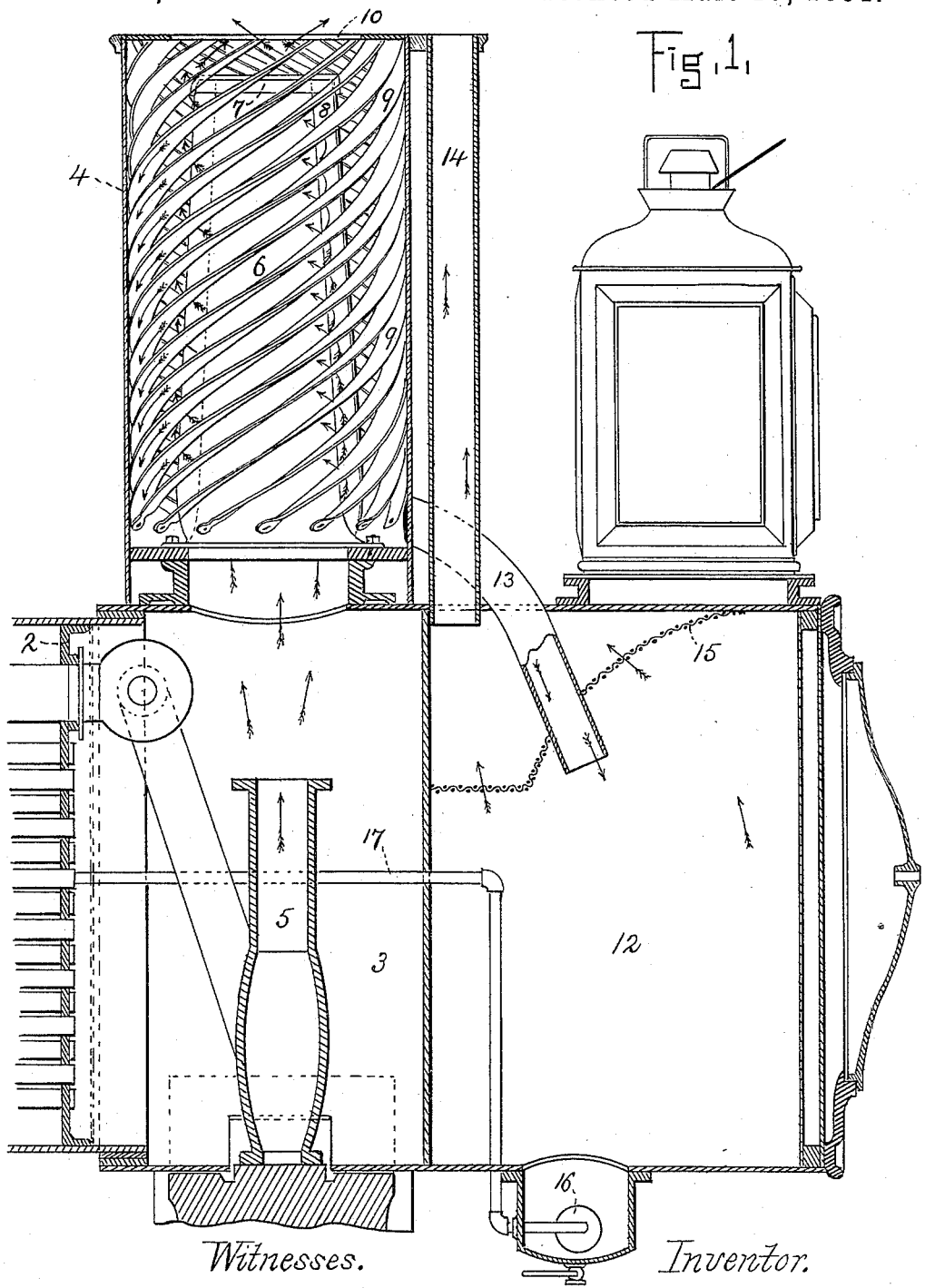
Figure 2:
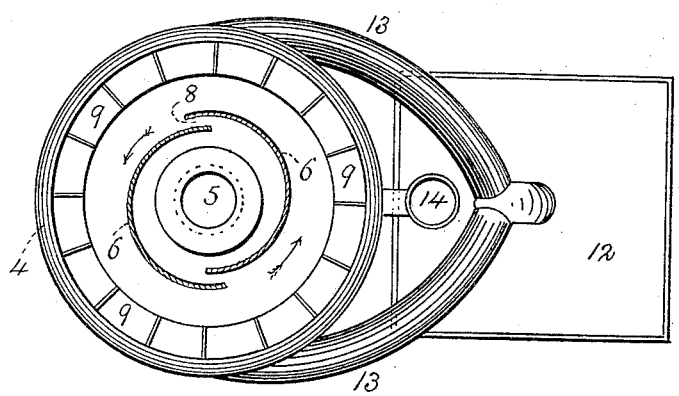
Figure 3:
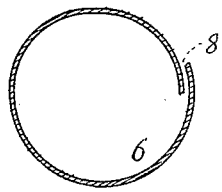
Figure 4:
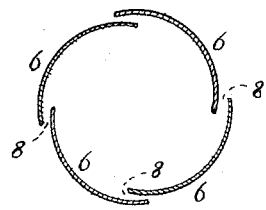

The drawings represent, in Figure 1, a vertical sectional elevation of a spark-arrester embodying my invention. Fig. 2 is a plan of the same with the current-changer in cross-section. Figs. 3 and 4 are modified constructions of the current-changer.

In the accompanying drawings I have shown my invention as applied to the end, in part, of a furnace or locomotive boiler, in which the tube-sheet is indicated at 2. The tubes open into the chamber 3, constituting the boiler-head, from which rises the usual cylindrical smoke stack 4, open at the top. Centrally of the chamber 3 is placed the steam-nozzle 5, since my invention is to be attached where a forced draft is employed.

Within the stack and firmly secured to an annular collar riveted upon the shell of the boiler-head are two semicircular or segmental plates 6 6, eccentrically disposed and surmounted and closed at the top by a cap 7. Since the vertical edges or sides of these plates are non-contiguous and overlap, two vertical openings 8 8 are formed the entire length of said plates. The furnace has communication with the stack only through the longitudinal apertures, since said stack is closed at the base where it is fastened to the boiler-shell. By such an arrangement it will be seen that the course of the waste solid and gaseous matter from the tubes of the furnace, together with the steam discharged through the nozzle 5, all of which passes directly and vertically upward into the passage formed by said semicircular plates, is changed, and this straight-line travel is converted into oblique or horizontal circular movement. Furthermore, it will be seen that the diameter of the stack is considerably larger than the inclosed current-changing plates, thus creating an annular space, in which are placed a series of spiral blades or deflectors 9 9. These are fastened to the interior walls of the stack, as shown. The effect of these deflectors, in connection with the current of mixed waste solid and gaseous matter emerging from the vertical openings 8 8, the whole mass having circular motion, is to separate the solid matter from the gaseous matter. This is produced by the retardation of the solid particles, which loose their momentum when they strike the deflectors, and are consequently directed downwardly, while the gaseous matter, having great elasticity when it strikes the deflectors, passes upwardly by a natural flow through the open mouth 10 of the stack. The current-changing plates 6 and the spiral deflectors 9 preferably extend throughout the entire vertical length of the stack, or approximately so, thereby utilizing the whole length of the stack in the separation of the sparks and cinders from the gaseous matter as the smoke and steam rise or pass through the stack. From this it results that the separation is more complete than would be possible if only a short section of the stack were utilized for this purpose. In order to retain the cinders thus prevented from escaping a chamber 12, having no direct communication with the furnace, is bolted to the boiler-head. Diametrically at the base of the stack are secured two pipes 13 13, which interconnect the chamber 12 with the stack and serve to convey the solid waste matter into the storage-chamber 12. In order to create a slight current into said chamber to clear the pipes 13, a small flue 14 is adjusted in front of the stack, and preferably of the same length. Obliquely across the upper part of the chamber, or subdividing it in any suitable manner, is affixed a screen or perforated plate 15, the delivery ends of the pipes 13 13 terminating beneath, while the outlet end of the pipe 14 is above. By this means only the very finest of the waste solid matter from the furnace is permitted to escape, the other and coarser particles are retained and allowed to pass out or be discharged through a blow-off 16, while a steam-pipe 17 from the boiler serves to produce such discharge.

The object of my invention, as before described, is to check the draft as little as possible, retain the solid waste matter in part, and permit the gases and steam to pass away without retardation. The full area of discharge is therefore retained at all points, since the vertical orifices in the current-changing device are equal to if not greater than the area of the same in cross-section. Hence the draft through the tubes, aided by the steam discharged through the nozzle 5, is not materially retarded or checked. A further advantage consists in the fact that this appliance can be attached to any existing type of locomotive-boiler without changes, except to substitute the common stack for one of my construction and by the addition of the chamber 12 to the boiler-head easily bolted in place.

In Fig. 3 of the drawings the current-changer is made of a single plate bent upon itself and with the sides overlapping, but non-contiguous, to impart a circular or rotary motion to the escaping matter, while Fig. 4 shows a series of plates arranged in a similar manner to create rotary motion.

What I claim is—

1. In a spark-arrester for smoke-stacks, a current-changer composed of a curved plate bent upon itself to create a central bore, having its adjacent side edges overlapping but non-contiguous, open at its lower and capped at its upper end to cause the current which enters at the bottom in straight paths to escape laterally and have rotary motion imparted to it, said plate extending approximately throughout the length of the smoke-stack, substantially as stated.

2. In spark-arresters, the combination, with a stack open at the top and closed at the bottom, of a current-changer, as described, which interconnects said stack with the furnace and which extends approximately throughout the length of said stack, and the deflector-plates secured exteriorly to the stack and also extending throughout the length of the same, or approximately so, substantially as set forth.

3. A spark-arrester composed of two or more curved or segmental plates eccentrically arranged to form vertical openings between their overlapping sides, said plates extending approximately the entire length of the stack, and a cap which surmounts the upper ends of said plates, combined with the surrounding stack closed at its base and open at its upper end to cause the escaping matter traveling in straight paths to assume a horizontal rotary movement, substantially as herein set forth.

4. The combination, with a stack open at its top and closed at its bottom and provided with a series of oblique spiral deflectors attached to the interior wall of said stack and extending throughout the length thereof, or approximately so, of two or more curved plates placed vertically within said stack and having their adjacent side edges non-contiguous, said curved plates also extending approximately throughout the length of the stack, substantially as set forth.

5. In combination with a furnace, a cylindrical current-changer having vertical apertures and acting in part as the flue or discharge for the furnace, a stack inclosing said current-changer, the spiral deflectors within said stack, the cinder-chamber, its inlet-supply from the stack, and its outlet-discharge to the air, substantially as specified.

6. The combination, with a furnace, the chamber 3, the main stack furnished with interior spiral deflectors, and the current-changer, as described, which interconnects said stack with the chamber, of the cinder-chamber 12, partitioned with a screen-plate, its exhaust-flue 14, and one or more pipes 13, which connect the main stack with the cinder-chamber, substantially as described.

7. The combination, with a furnace, the chamber 3, the main stack furnished with interior deflectors, and the current-changer, as described, of the cinder-chamber partitioned by a screen, its flue 14, the supply-pipes 13, and the opening for cinder-discharge, substantially as specified.

In testimony whereof I affix my signature in presence of two witnesses.

GEORGE FRANK EVANS.

Witnesses:
H. E. LODGE,
FRANCIS C. STANWOOD.